(12) United States Patent
Lee

(10) Patent No.: US 6,350,039 B1
(45) Date of Patent: Feb. 26, 2002

(54) WALL SWITCH AND LAMP ASSEMBLY

(76) Inventor: Chien-Yu Lee, 4F-1,No. 45,Pao Chung Rd., Hsintien City, Taipei Hsien (TW)

( * ) Notice: Subject to any disclaimer, the term of this patent is extended or adjusted under 35 U.S.C. 154(b) by 0 days.

(21) Appl. No.: 09/724,825

(22) Filed: Nov. 28, 2000

(30) Foreign Application Priority Data

Oct. 6, 2000 (TW) ........................................ 87211980 U

(51) Int. Cl.⁷ .............................................. F21V 33/00
(52) U.S. Cl. ........................ 362/95; 362/147; 362/800; 362/249; 200/317; 200/310
(58) Field of Search .......................... 362/95, 147, 800, 362/249, 234, 276, 802, 252; 200/310, 317, 312, 311

(56) References Cited

U.S. PATENT DOCUMENTS

| | | | | |
|---|---|---|---|---|
| 2,749,428 A | * | 6/1956 | McCarthy | 362/95 |
| 4,000,405 A | * | 12/1976 | Horwinski | 362/95 |
| 4,038,582 A | * | 7/1977 | Horwinski | 362/95 |
| 4,255,780 A | * | 3/1981 | Sakellaris | 362/95 |
| 4,514,789 A | * | 4/1985 | Jester | 362/95 |
| 4,774,641 A | * | 9/1988 | Rice | 362/95 |
| 5,660,459 A | * | 8/1997 | Appelberg | 362/95 |
| 5,833,350 A | * | 11/1998 | Moreland | 362/95 |

* cited by examiner

*Primary Examiner*—Thomas M. Sember
(74) *Attorney, Agent, or Firm*—Pro-Techtor International Services

(57) ABSTRACT

A wall switch and lamp assembly is constructed to include a lamp circuit and reflector unit covered on the wall. A wall switch unit is fastened to the wall to hold down the lamp circuit and reflector unit, and an intermediate light-penetrable panel is retained between the lamp circuit and reflector unit and the wall switch unit. The intermediate light-penetrable panel having a center opening, which receives the shell of the push-button switch of the wall switch unit. The lamp circuit and reflector unit include a circuit board having a set of LEDs. A light guide panel is adapted to receive the circuit board and to reflect the light of the LEDs through the intermediate light-penetrable panel.

2 Claims, 4 Drawing Sheets

WALL SWITCH AND LAMP ASSEMBLY

BACKGROUND OF THE INVENTION

The present invention relates to wall lamps and, more specifically, to a wall switch and lamp assembly, which comprises a wall switch unit for on/off power control, an intermediate light-penetrable panel, and a lamp circuit and reflector unit that emits light subject to the intensity of ambient light and reflect the light through the intermediate light-penetrable panel.

A conventional wall switch is installed in the wall for on/off power control. When entering the room in the dark, it is difficult to immediately find out the accurate position of the wall switch, and an accident may occur when trying to switch on the wall switch in the dark. In order to eliminate this problem, a wall switch with neon lamp means has been disclosed. However, because the intensity of light of a neon lamp is low, it does not provide sufficient illumination. Further, conventional wall lamps commonly use a lamp bulb or lamp tube to produce light. These conventional wall lamps consume much power supply. Another drawback of these conventional wall lamps is their short service life. Further, regular wall switches are disposed at accessible locations. When operating a wall switch, the hand may touch the wall surface around the wall switch, causing the surrounding wall surface to be contaminated.

SUMMARY OF THE INVENTION

The present invention has been accomplished under the circumstances in view. It is one object of the present invention to provide a wall switch and lamp assembly, which combines a wall switch and a wall lamp so that sufficient illumination is provided to illuminate the wall switch when in the dark. It is another object of the present invention to provide a wall switch and lamp assembly, which consumes less power supply and, has a long service life. According to one aspect of the present invention, the wall switch and lamp assembly comprises a lamp circuit and reflector unit covered on the wall, a wall switch unit fastened to the wall to hold down the lamp circuit and reflector unit, and an intermediate light-penetrable panel retained between the lamp circuit and reflector unit and the wall switch unit. The intermediate light-penetrable panel has a center opening, which receives the shell of the push-button switch of the wall switch unit. The lamp circuit and reflector unit comprises a circuit board having a set of LEDs, and a light guide panel adapted to receive the circuit board and to reflect the light of the LEDs through the intermediate light-penetrable panel. According to another aspect of the present invention, the wall switch unit is received within the intermediate light-penetrable panel so that when the intermediate light-penetrable panel prevents the user from touching the surrounding wall surface when operating the push-button switch of the wall-mounting switch panel. According to still another aspect of the present invention, the circuit board comprises an electronic circuit having a photosensitive resistor switch, which automatically control the operation of the LEDs subject to the intensity of ambient light.

BRIEF DESCRIPTION OF THE DRAWINGS

FIG. 5 is another perspective view of the present invention, showing the LEDs turned on.

DETAILED DESCRIPTION OF THE PREFERRED EMBODIMENT

Figure 1:
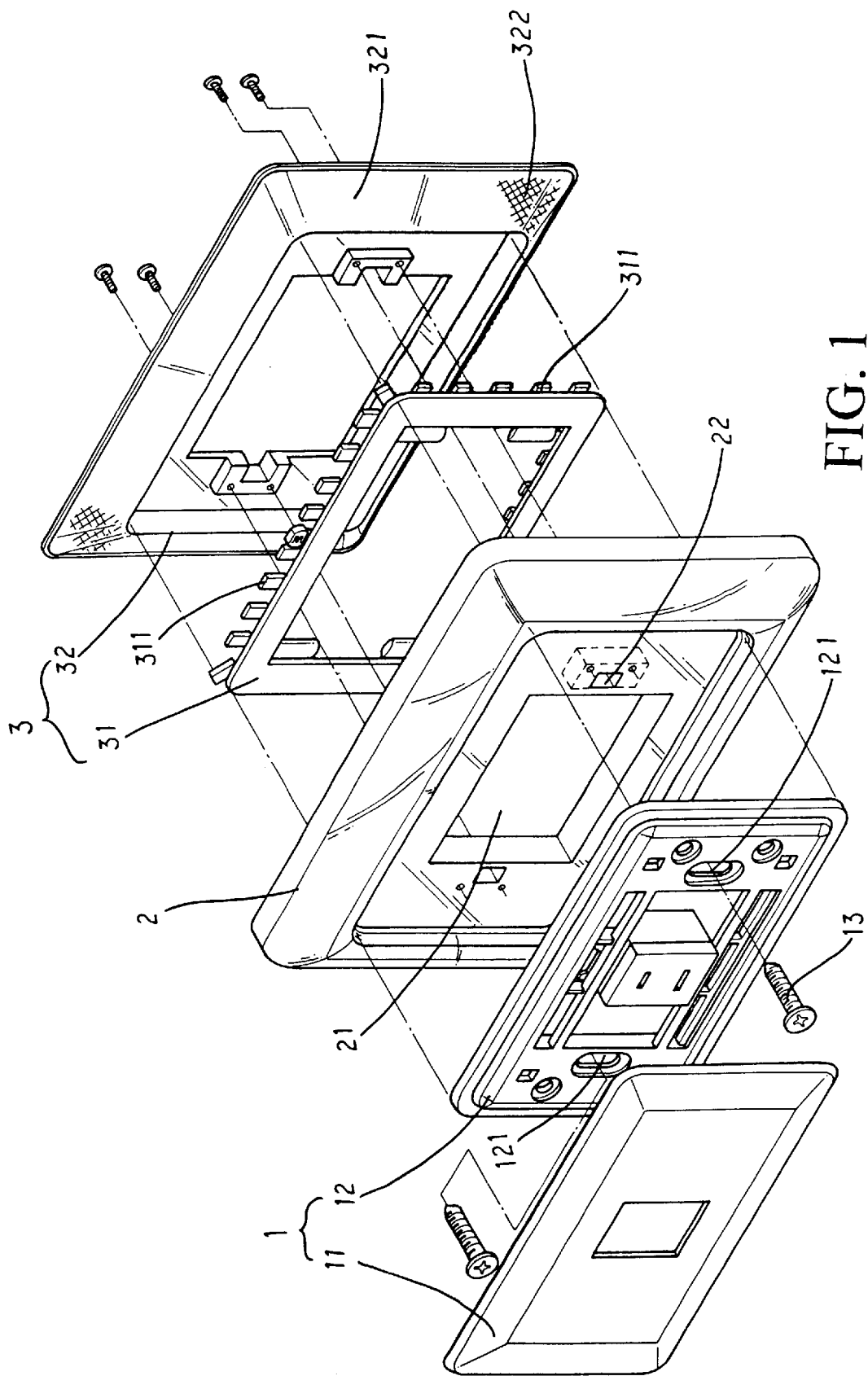
FIG. 1 is an exploded view of a wall switch and lamp assembly according to the preferred embodiment of the present invention.
Figure 2:
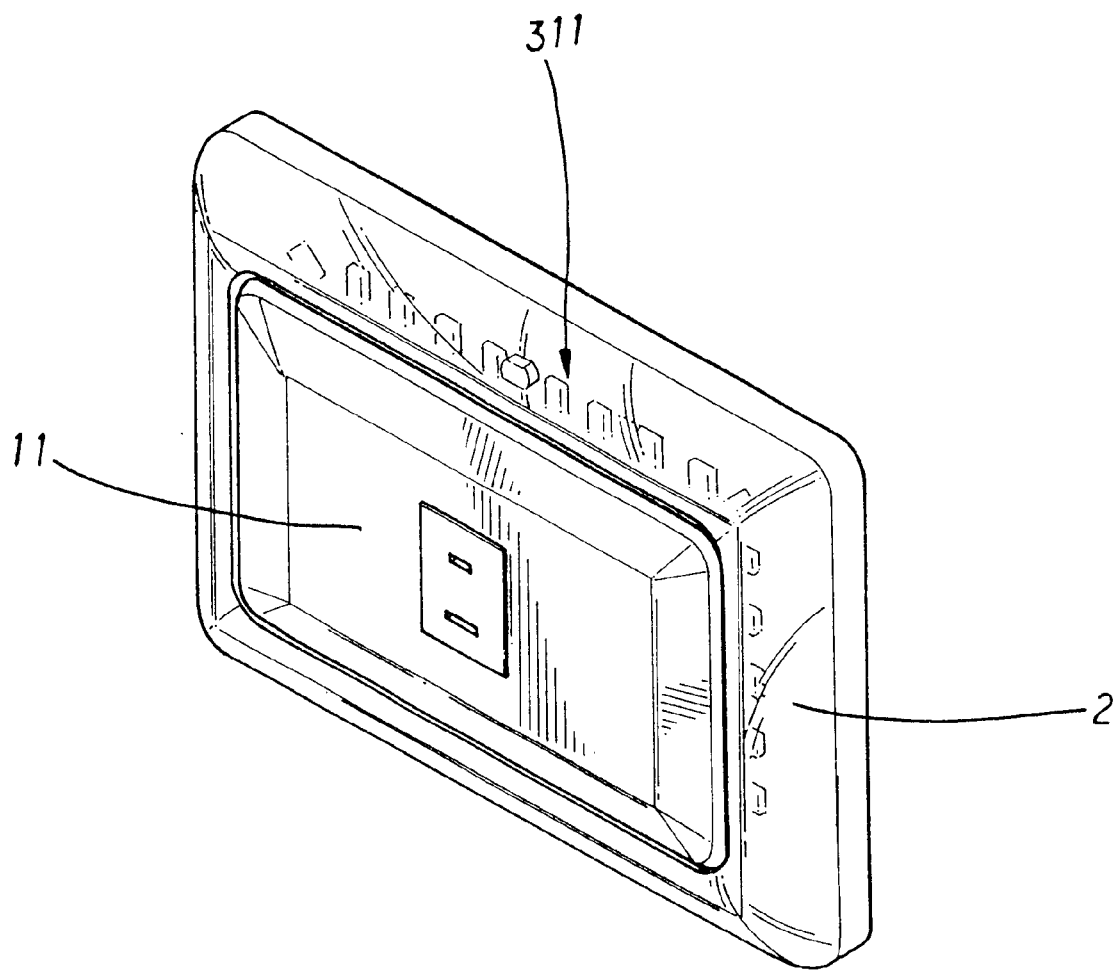
FIG. 2 is a perspective view of the wall switch and lamp assembly according to the preferred embodiment of the present invention.

Referring to FIGS. from 1 through 4, a wall switch and lamp assembly in accordance with the present invention is generally comprised of a wall switch unit 1, an intermediate light-penetrable panel 2 that admits light, and a lamp circuit and reflector unit 3. The wall switch unit 1 comprises a wall-mounting switch panel 12, and a face panel 11. The wall-mounting switch panel 12 comprises two mounting holes 121 disposed near to two lateral sides thereof, and fastened to the wall 4 by fastening elements, for example, screws 13. The intermediate light-penetrable panel 2 is a flat, center-recessed, substantially rectangular open frame adapted to receive the wall switch unit 1, having a center opening 21 adapted to receive the backwardly protruded shell of the push-button switch of the wall-mounting switch panel 12, and two through holes 22 spaced from two opposite lateral sides of the center opening 21 for the passing of the screws 13. The lamp circuit and reflector unit 3 comprises a rectangular circuit board 31, and a light guide panel 32. The circuit board 31 comprises a plurality of LEDs (light emitting diodes) 311 spaced around the periphery and connected in series to an electronic circuit at the backside thereof (not shown). The electronic circuit uses a photosensitive resistor switch to control the operation of the LEDs 311 subject to the intensity of ambient light. Because the photosensitive resistor switch is of the known art and not within the scope of the present invention, it is not described in detail. The light guide panel 32 is a flat, substantially rectangular open frame adapted for covering on the wall to receive the circuit board 31 and the intermediate light-penetrable panel 2 on the circuit board 31, comprising a back reflector layer 322 adhered to the back sidewall thereof and adapted to reflect light from the LEDs 311 through the intermediate light-penetrable panel 2, and a beveled peripheral face 321 sloping downwardly outwards.

Referring to FIGS. from 2 through 3 and FIG. 1 again, during installation, the intermediate light-penetrable panel 2 is retained between the lamp circuit and reflector unit 5 and the wall-mounting switch panel 12 of the wall switch unit 1, and then the push-button switch of the wall-mounting switch panel 12 and the circuit board 31 are electrically connected in parallel to the hot and neutral wires of power supply (not shown), and then screws 13 are inserted through the mounting holes 121 of the wall-mounting switch panel 12 and the through holes 22 of the intermediate light-penetrable panel 2 and threaded into the wall 4 to fixedly secure the wall-mounting switch panel 12, the intermediate light-penetrable panel 2 and the lamp circuit and reflector unit 3 to the wall 4, and then the face panel 11 is covered on the wall-mounting switch panel 12.

Figure 4:
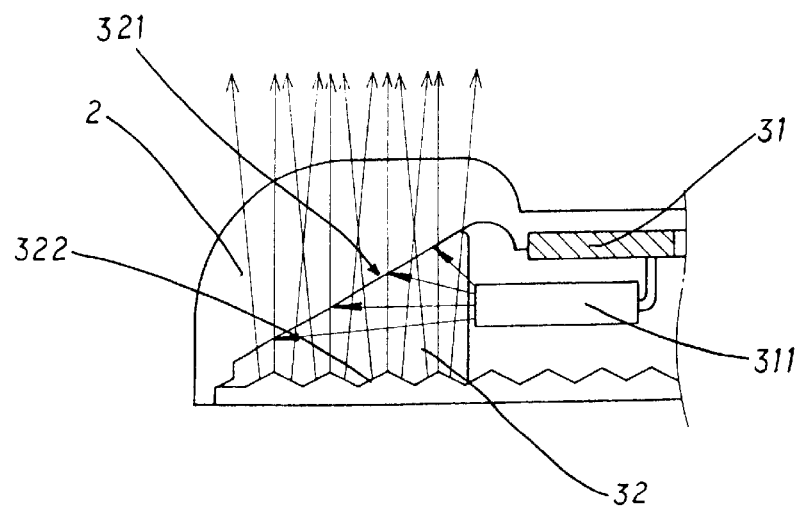
FIG. 4 is a schematic drawing showing light rays reflected through the beveled peripheral face of the light guide panel according to the present invention.
Figure 5:
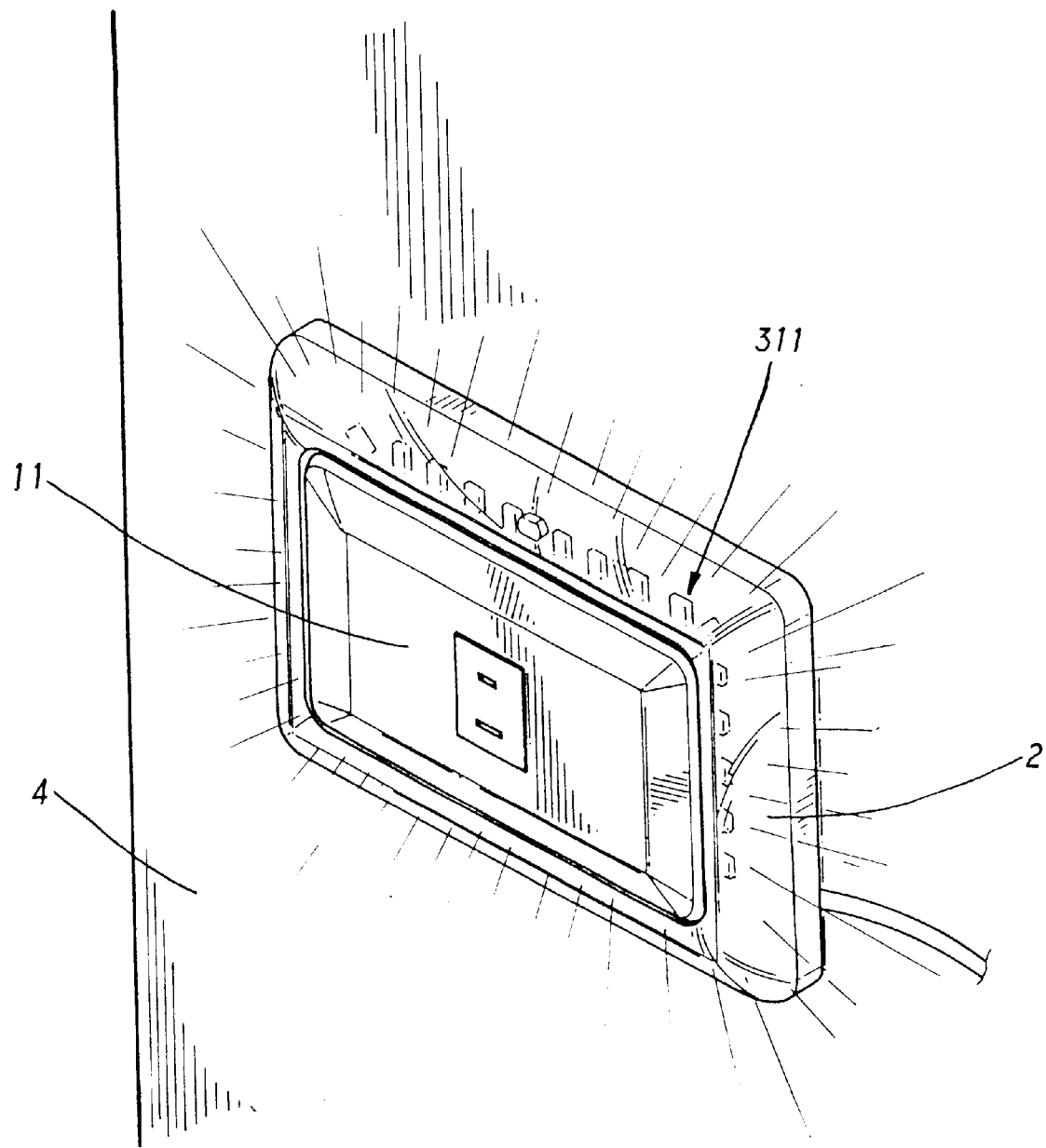

Referring to FIGS. 4 and 5, when in the dark, the photosensitive resistor switch of the circuit board 31 is induced to switch on the LEDs 311, and the back reflector layer 322 of the light guide panel 32 reflects the light of the LEDs 311 through the beveled peripheral face 321 of the light guide panel 32 and the intermediate light-penetrable panel 2.

Figure 3:
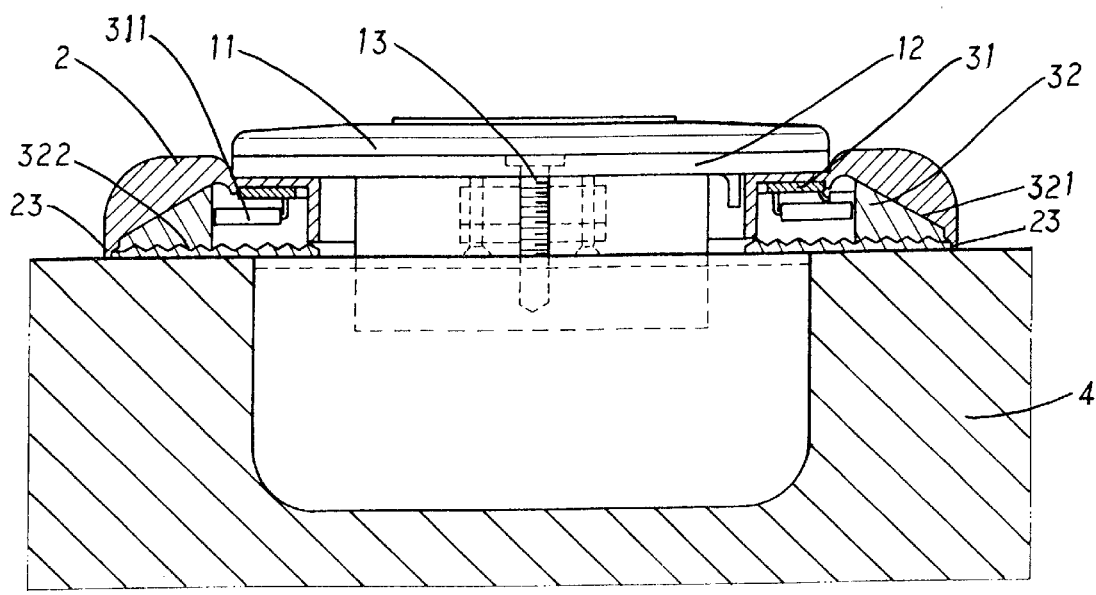
FIG. 3 is a sectional assembly view showing the wall switch and lamp assembly installed in the wall according to the present invention.

Referring to FIG. 3 again, the intermediate light-penetrable panel 2 has a peripheral coupling flange 23 hooked on the periphery of the light guide panel 32 of the lamp circuit and reflector unit 3.

While only one embodiment of the present invention has been shown and described, it will be understood that various modifications and changes could be made thereunto without departing the spirit and scope of the invention disclosed.

Reference Numbers in Drawings 1 wall switch unit
11 face panel
12 wall-mounting switch panel
121 mounting hole
13 screw
2 intermediate light-penetrable panel
21 center opening
22 through hole
23 peripheral coupling flange
3 reflector unit
311 LED
32 light guide panel
321 beveled peripheral face
322 back reflector layer
4 wall What the invention claimed is:

1. A wall switch and lamp assembly comprising:

a lamp circuit and reflector unit, said lamp circuit and reflector unit comprising a light guide panel shaped like a flat rectangular open frame, and a circuit board, said circuit board comprising an electronic circuit and a plurality of light emitting diodes connected in series and controlled by said electronic circuit, said light guide panel comprising a beveled peripheral face and a reflector layer adhered to a back sidewall thereof and adapted to reflect the light of said light emitting diodes through said beveled peripheral face;

a wall switch unit, said wall switch unit comprising a wall-mounting switch panel having a push-button switch, and a face panel covered on said wall mounting switch panel, said wall-mounting switch panel comprising two mounting holes disposed near to two lateral sides thereof and fastened to the wall by fastening elements; and an intermediate light-penetrable panel mounted in between said lamp circuit and reflector unit and said wall switch unit, said intermediate light-penetrable panel having a center opening adapted to receive the push-button switch of said wall-mounting switch panel, and two through holes adapted to receive the fastening elements that are mounted in the mounting holes of said wall-mounting switch panel to secure said wall-mounting switch panel to the wall.

2. The wall switch and lamp assembly of claim 1 wherein said intermediate light-penetrable panel has a peripheral coupling flange hooked on the periphery of said light guide panel of said lamp circuit and reflector unit.

* * * * *